(12) United States Patent
Drobe et al.

(10) Patent No.: US 12,523,891 B2
(45) Date of Patent: Jan. 13, 2026

(54) OPTICAL DEFICIENCY MONITORING EQUIPMENT COMPRISING A PAIR OF EYEGLASSES

(71) Applicant: Essilor International, Charenton-le-Pont (FR)

(72) Inventors: Bjorn Drobe, Singapore (SG); Adeline Yang, Singapore (SG)

(73) Assignee: Essilor International, Charenton-le-Pont (FR)

( * ) Notice: Subject to any disclaimer, the term of this patent is extended or adjusted under 35 U.S.C. 154(b) by 307 days.

(21) Appl. No.: 18/006,204

(22) PCT Filed: Jul. 20, 2021

(86) PCT No.: PCT/EP2021/070266
§ 371 (c)(1),
(2) Date: Jan. 20, 2023

(87) PCT Pub. No.: WO2022/018080
PCT Pub. Date: Jan. 27, 2022

(65) Prior Publication Data
US 2023/0258963 A1 Aug. 17, 2023

(30) Foreign Application Priority Data
Jul. 23, 2020 (EP) ..................................... 20305849

(51) Int. Cl.
G02C 11/00 (2006.01)
A61B 5/00 (2006.01)
G02C 7/02 (2006.01)

(52) U.S. Cl.
CPC ............ *G02C 11/10* (2013.01); *A61B 5/6803* (2013.01); *G02C 7/027* (2013.01); *G02C 2202/24* (2013.01)

(58) Field of Classification Search
USPC ............................................ 351/158, 159.79
See application file for complete search history.

(56) References Cited

U.S. PATENT DOCUMENTS

2015/0036102 A1* 2/2015 Ghosh ...................... G02C 7/02
351/159.79
2017/0336653 A1 11/2017 Bakaraju
(Continued)

FOREIGN PATENT DOCUMENTS

CN 109814278 A 5/2019
GB 2495697 A 4/2013
(Continued)

OTHER PUBLICATIONS

International Search Report Issued Oct. 27, 2021, in PCT/EP2021/070266, filed on Jul. 20, 2021, citing documents 1-2 & 15-17, therein, 3 pages.
(Continued)

*Primary Examiner* — Darryl J Collins
(74) *Attorney, Agent, or Firm* — Oblon, McClelland, Maier & Neustadt, L.L.P.

(57) ABSTRACT

A monitoring equipment including an eyewear that includes a frame, at least one lens that is fixed to the frame and that is able to change the natural evolution of an optical deficiency, a wearing sensor able to determine if the eyewear is being worn by a wearer, and a processing unit that is programmed to acquire the data determined by the wearing sensor, deduce therefrom a parameter relative to the length of time the wearer has worn the eyewear during a predetermined period, and compare said parameter with at least a predetermined datum to determine a level of efficiency of the optical deficiency treatment.

12 Claims, 1 Drawing Sheet

(56) References Cited

U.S. PATENT DOCUMENTS

Figure 1:
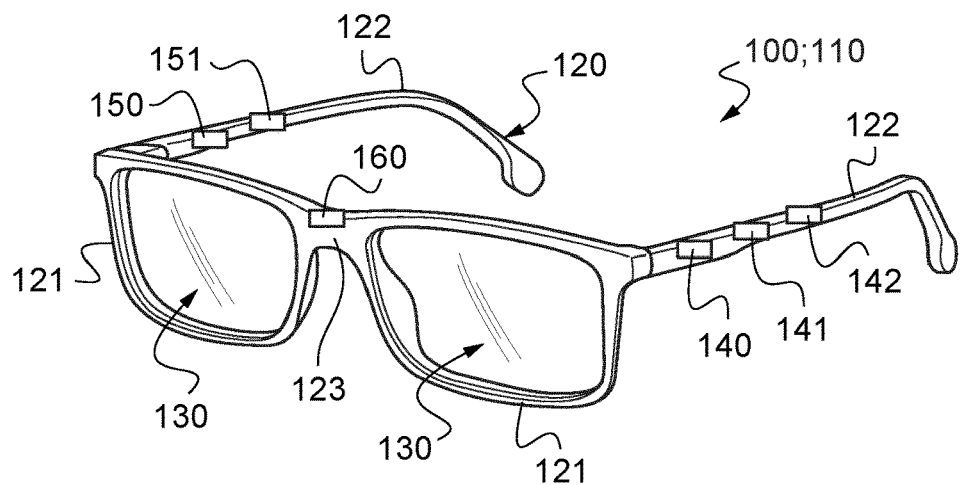

| | | | |
|---|---|---|---|
| 2018/0049697 A1* | 2/2018 | Rousseau | G02B 27/0093 |
| 2019/0252054 A1 | 8/2019 | Dirani et al. | |
| 2019/0302484 A1* | 10/2019 | Zhang | G02C 5/143 |
| 2022/0035179 A1 | 2/2022 | Rappon et al. | |

FOREIGN PATENT DOCUMENTS

| | | |
|---|---|---|
| TW | 202015633 A | 5/2020 |
| WO | WO 2013/050735 A1 | 4/2013 |
| WO | WO 2019/166654 A1 | 9/2019 |
| WO | WO 2020/099549 A1 | 5/2020 |
| WO | WO 2020/126514 A1 | 6/2020 |

OTHER PUBLICATIONS

Japanese Office Action issued Feb. 26, 2024 in Japanese Patent Application No. 2023-504629 (with English translation), citing reference 15 therein, 8 pages.

Combined Chinese Office Action and Search Report issued Apr. 7, 2025, (Client Received Apr. 30, 2025) in corresponding Chinese Patent Application No. 202180059214.4 (with English Translation) citing document 15 therein, 15 pages.

* cited by examiner

OPTICAL DEFICIENCY MONITORING EQUIPMENT COMPRISING A PAIR OF EYEGLASSES

TECHNICAL FIELD OF THE INVENTION

The invention relates to the optical domain, and more specifically to the domain of measurements of the time of wearing eyeglasses.

The invention is mainly intended for myopic and pre-myopic children wearing myopia control lenses.

BACKGROUND INFORMATION AND PRIOR ART

Myopia has increased worldwide during recent years and is becoming a serious public problem. For instance, in East Asia, the prevalence can reach 80% of the population.

In this context, many techniques have been developed, to stop or slow down the evolution of myopia. Among these techniques, several strategies based on special corrective eyeglasses have been reported as effective.

One of the important parameters to reduce this evolution is to wear the special corrective eyeglasses very regularly. But this regularity is difficult to control in children, especially when they can still see well enough to play without their glasses.

Assessing this parameter of wearing time is crucial to predict the outcome of the treatment.

Moreover, other parameters relating to the environment of the eyeglasses wearer can be important to monitor. Indeed, some visual environments are more subject to Myopia development than others (indoor generates more Myopia than indoor).

Consequently, there is a need for a technique enabling to provide measures of the above-mentioned parameters so as to evaluate and increase the efficacy of a myopia treatment.

This need does not concern only myopia but also other problems in the optical domain where the wearing of eyeglasses is required to stop or slow down the evolution of the problem, for instance visual fatigue, age related macular degeneration.

Document GB2495697 teaches that improvement in vision of a child is strongly correlated to the amount of the spectacles wearing. To monitor in what extent a spectacle is worn by a child, this document discloses a sensor able to determine when the spectacles are being worn by a child.

The problem of this solution is that it does not address the above-mentioned problem since it aims at measuring the time the equipment is worn so as to improve vision when we would like to prevent degradation (myopia prevention), or avoid degradation (myopia stabilization) or limit the degradation (myopia progression slow down).

Moreover, this document only teaches about monitoring the child but it does not mention that a feedback can be given to him.

SUMMARY OF THE INVENTION

In this context, the present invention provides a global solution ensuring the best impact on the optical degradation, by giving feedback to the eyeglasses wearer.

This invention consists in a monitoring equipment comprising a eyewear that includes:

a frame,
at least one lens that is fixed to the frame and that is able to change the natural evolution of an optical deficiency,
a wearing sensor able to determine if the eyewear is being worn by a wearer, and
a processing unit that is programmed to:
1—acquire the data determined by the wearing sensor,
2—deduce therefrom a parameter relative to the length of time the wearer has worn the eyewear during a predetermined period, and
3—compare said parameter with at least a predetermined datum to determine a level of efficiency of the optical deficiency treatment.

Preferably, in a fourth step, the processing unit sends this level of efficiency to an HMI (Human-Machine Interface) or processes this level of efficiency in order to generate data to be sent to the HMI. This data can be an information relating to the duration of wear of the eyewear, or an advice enabling the wearer to know if the efficiency of the treatment is improving, or an alert, etc Other combinable features of the invention are:
said at least a predetermined datum belongs to a model that links durations of wearing the eyewear with efficiency values of the optical deficiency treatment,
after the comparison of said parameter with said at least a predetermined datum, the processing unit is programmed to deduce therefrom an advice relating to the duration the eyewear has to be worn, and to provide this advice to the wearer by means of a human-machine interface,
said at least one lens includes a first optical refraction area for providing correct vision to the wearer at a determined distance, and a second optical refraction area for changing the natural evolution of the optical deficiency,
the eyewear includes a computer memory that stores a type of the second optical refraction, and said model is selected as a function of said type,
the second optical refraction is of the type selected among optical elements designed to deviate rays of light to lower an eye elongation signal in front of the wearer's retina when the wearer wear said eyewear, or an addition of optical power and a prismatic optical power, or additional positive power in the lens periphery, or scattering elements in the lens,
the optical deficiency being myopia, said at least one lens is designed to slow down the natural evolution of the optical deficiency,
said at least one wearing sensor is embedded in the frame,
said at least one wearing sensor is designed to be removably attached to the frame,
said processing unit is remoted from the eyewear and wherein said eyewear comprises a communication unit able to send said data determined by the wearing sensor to the processing unit,
the eyewear comprises an additional sensor able to determine a time information to be associated with said data and said parameter is determined as a function of said time information,
the processing unit is embedded in a mobile electronic device, preferably in a smartphone,
the monitoring equipment comprises a human-machine interface, and the processing unit is able to command said human-machine interface so as to show the duration of wearing the eyewear by the wearer,
said processing unit is programmed to deduce from the duration of the wearing of the eyewear by the wearer an advice relating to the duration the eyewear has to be worn, and to provide this advice to the wearer by means of a human-machine interface, said processing unit is programmed to deduce from the duration of wearing the eyewear by the wearer an alert relating to the need for the wearer to change his habits, and to provide this alert to the wearer by means of a human-machine interface, the eyewear comprises another sensor able to determine an environment parameter, relating for instance to the environment brightness and/or to the situation of the wearer indoor or outdoor, and said level of efficiency is determined based on said environment parameter, The invention also relates to a method of monitoring a wearer of eyewear that includes a frame, at least one lens that is fixed to the frame and that is able to change the natural evolution of an optical deficiency, and a wearing sensor able to determine if the eyewear is being worn by a wearer, said method comprising steps of:

acquiring a data determined by the wearing sensor, deducing therefrom a parameter relative to the length of time the wearer has worn the eyewear during a predetermined period, and comparing said parameter with at least a predetermined datum to determine a level of efficiency of the optical deficiency treatment.

DETAILED DESCRIPTION OF EXAMPLE(S)

The following description with reference to the accompanying drawings, given by way of non-limiting example makes it clear what the invention consists in and how it can be reduced to practice.

Figure 2:
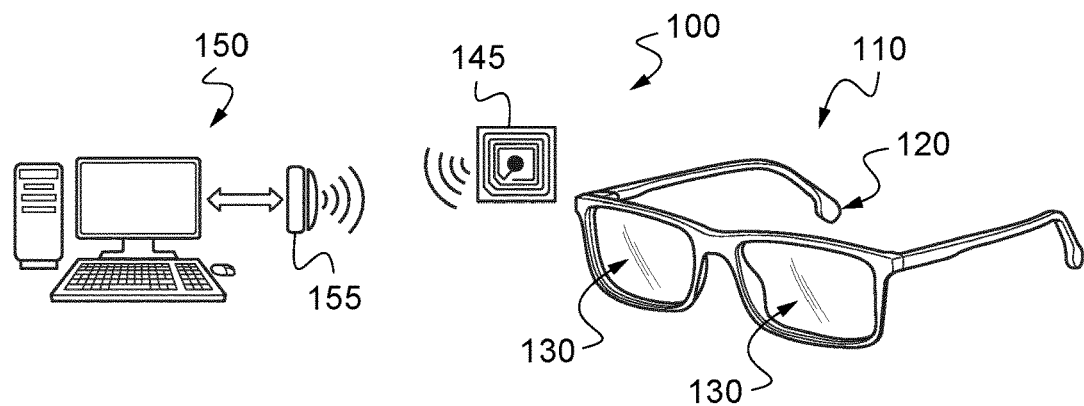
Figure 3:
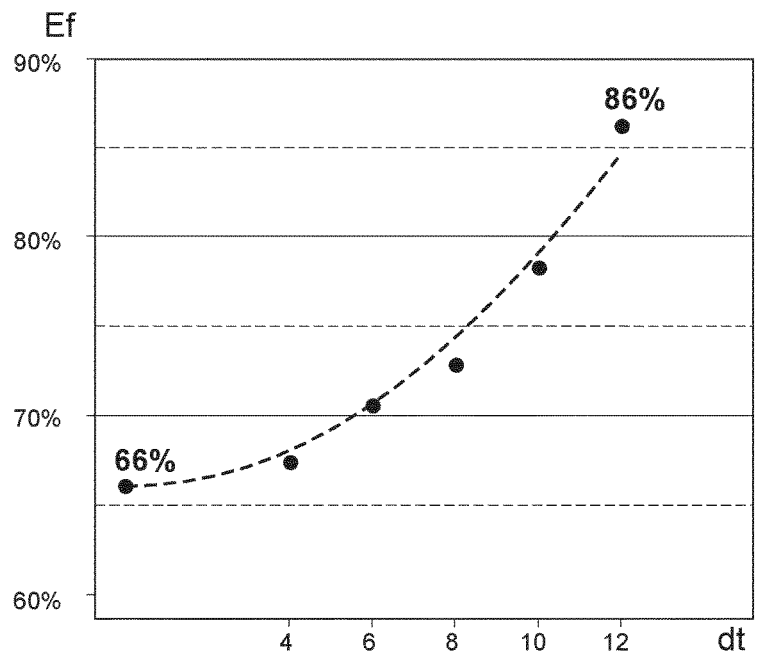

In the accompanying drawings:

FIG. 1 is a schematic view of a first embodiment of the monitoring equipment according to the invention, FIG. 2 is a schematic view of a second embodiment of the monitoring equipment according to the invention, and FIG. 3 is a graph illustrating the efficiency variation of a treatment as a function of the duration of wearing a pair of eyeglasses per day.

The invention relates to a monitoring equipment 100 comprising an eyewear having at least one lens designed to change the natural evolution of an optical deficiency.

In the following description, the considered optical deficiency will be myopia but the invention can also apply to other types of visual defects requiring the wearing of an eyewear to prevent a deterioration of vision quality, such as visual fatigue, jet lag, phototoxicity, age related macular degeneration. Eye elongation and axial length are the main markers to follow during the evaluation of natural evolution of myopia.

The monitoring equipment 100 according to the invention is a specific combination of the following elements:

the eyewear, a wearing sensor 140 able to determine if the eyewear is being worn by a wearer, and a processing unit 150.

As used herein, the term "eyewear" refers generally to items and accessories worn on or over the eyes, which may be for purposes of improving or enhancing visual acuity or for purposes of myopia prevention.

In the FIGS. 1 and 2, we have represented two embodiments of this monitoring equipment 100. These two embodiments have several common features and will therefore be described together.

In these embodiments, the eyewear is a pair of eyeglasses 110 that includes a frame 120, and two lenses 130 fixed to the frame. In a variant, this eyewear could have a different shape (goggles, etc).

The frame 120 is a structure receiving, retaining, holding, and/or supporting the lenses such that these lenses 130 can be placed in front of respective eyes of a wearer when the pair of eyeglasses 110 is being worn.

As shown in the Figures, the frame 120 includes two rims 121 for receiving the lenses 130. Here, each of the two rims 121 is a full rim. According to various embodiments, the rims may also be half rims, or the frame 120 may be without rim (the lenses being screwed onto the frame). Accordingly, the frame 120 may be a full rimmed frame or a semi-rimless frame or a rimless frame.

The frame 120 includes a bridge 123, situated above the nose of the wearer when the pair of eyeglasses 110 is being worn.

The frame 120 also includes a pair of frame temples 122. The pair of frame temples 122 constitutes a pair of elongated side pieces of the frame 120, rested on the ears of the wearer when the pair of eyeglasses 110 is being worn.

The lenses 130 are designed to modify the natural evolution of an optical deficiency, here myopia.

Each lens 130 includes a first optical refraction area for providing correct vision to the wearer at a determined distance, and a second optical refraction area for changing the natural evolution of the optical deficiency.

The first optical refraction consists, for instance, in a spherical power for providing correct far vision to the wearer (for looking at objects situated at more than 6 meters). This first optical refraction can also include a cylindrical and/or a prismatic power.

The second optical refraction provides an additional optical feature. This refraction is specifically designed to prevent or to limit or to stop the evolution of myopia.

There are many types of lenses able to slow or stop myopia progression: this second optical refraction can be of these any type. It can be for instance selected among:

optical elements generating an eye elongation signal in front of the wearer's retina when the wearer wear said pair of eyeglasses, or an addition of optical power and/or of prismatic optical power, or additional positive power in the lens periphery, or scattering elements in the lens. The scattering elements could be either disposed on the lens surface or disposed in the lens.

Here, the second optical refraction is of the first type. It more specifically comprises optical elements designed to deviate rays of light to lower the eye elongation signal. These optical elements will deviate rays of light continuously in a nonlinear manner so as to create a three-dimensional quantity of light in front of the retina, in such a case, the myopia progression could be slowed down. This is called volume of myopic defocus (VoMD).

Here, the used myopia control lenses 130 contain preferably a plurality of at least three optical elements (lenslets). Such lenses are described for instance in document WO2019166654. Such a lens is intended to be worn in front of an eye of the wearer and comprises:

a refraction area having a first refractive power based on a prescription for correcting an abnormal refraction of said eye; and a plurality of at least three optical elements, at least one optical element having an optical function of not focusing an image on the retina of the eye so as to slow down the progression of the abnormal refraction of the eye.

The optical elements could be placed on at least one of the lens surface.

In a variant, a lens 130 comprises:

a first refraction area having a first refractive power based on a prescription for correcting an abnormal refraction of an eye; and second refraction areas having a refractive power different from the first refractive power, and having a function of focusing an image on a position other than a retina of the eye so as to suppress a progress of the abnormal refraction of the eye, the second refraction areas are formed as a plurality of respectively independent island-shaped areas in the vicinity of a center part of a lens, and the first refraction area is formed as the area other than the areas formed as the second refraction areas.

In another variant, a lens 130 comprises:

a central zone providing a first optical refraction for substantially correcting myopia associated with the foveal region of the wear's eye; and a peripheral zone surrounding the central zone, the peripheral zone providing a second optical correction for substantially correcting myopic or hyperopia associated with a peripheral region of the retina of the wearer's eye. The wearing sensor 140 is designed so as to determine if the pair of eyeglasses 110 is being worn by the wearer or not.

This sensor is preferably embedded in the frame. It is for instance molded into a part of the frame 120 (for instance in one of its temples).

In a variant, this wearing sensor 140 may be attached to the frame. It could be permanently attached to the frame, for instance by means of glue. Or it could be removably attached to the frame, for example by means of snap-fastening means or by Velcro®.

This sensor is designed to frequently detect a wearing state (a state "worn" or "not worn").

This wearing sensor can be of any kind. It can be:

a motion sensor, for example an accelerometer adapted to determine if the frame moves, a temperature sensor adapted to determine a temperature so as to deduce therefrom if the frame is in contact with the wearer's head or not, for example, a temperature sensor determining the temperature of an internal face of a temple, a pressure sensor adapted to determine if the frame temples bear against the wearer's head or not, a pH sensor adapted to determine if the frame is in contact with the wearer's head or not, a light sensor, an electric field sensor.

In the two embodiments shown in the Figures, it is an accelerometer. The use of such an accelerometer is advantageous because it can also detect the head posture, which posture can be used by the processing unit 150 to determine the vision posture of the wearer (a posture of near vision, a posture of far vision . . . ).

The frame 120 is preferentially fitted with means for accumulating or generating an electrical energy to supply the processing unit 150 with an electrical current.

These means comprise here an energy harvesting transducer 151 that converts some form of ambient energy into electricity. This transducer 151 can for instance generate an electrical current from movements of the frame or from sun light.

This transducer 151 is coupled with an energy processor that stores and delivers the electrical energy when needed by the processing unit 150.

In a variant, these means can comprise a battery. In this variant, the battery is preferably chosen to have a capacity allowing at least 6 months of battery life.

The processing unit 150 is programmed to:

acquire a data determined by the wearing sensor 140, deduce therefrom a parameter P1 relative to the length of time the wearer has worn the pair of eyeglasses 110 during a predetermined period, and compare said parameter P1 with at least a predetermined datum to determine a level of efficiency of the optical deficiency treatment (these steps will be described in more details hereinafter).

To this end, the processing unit 150 comprises a central processing unit (CPU), a memory and input/output components.

Thanks to its memory, the processing unit stores information used in the process described below. It stores in particular a computer application, consisting of computer programs comprising instructions, the execution of which allowing the implementation by the processing unit 150 of the method described below.

It also stores the type of lens 130 used to slow down the myopia evolution. As explained below, this data will be useful for the comparison step.

Thanks to its input/output components, the processing unit 150 can receive data measured by the wearing sensor 140.

It can also receive other information from others sensors, if any.

For instance, the frame 120 may comprise an environment sensor 142 able to determine an environment parameter, relating for example to the environment brightness and/or to the situation of the wearer (is he indoors or outdoors?). In this embodiment, the environment sensor 142 is a light detector suitable to determine a level of brightness and to send this level of brightness to the processing unit 150.

In the first embodiment shown in FIG. 1, this processing unit 150 is a microcontroller embedded in the pair of eyeglasses 110.

In the second embodiment shown in FIG. 2, this processing unit 150 is remoted from the pair of eyeglasses 110 and it is formed by a controller of a computer or of a mobile device such as a smartphone.

In these two embodiments, the pairs of eyeglasses 110 represented in the drawings have different specificities, which can now be successively described.

In the first embodiment, the pair of eyeglasses 110 is able to operate autonomously.

It could comprise an HMI (Human-Machine interface) to give some information (advice, alert . . . ) to the wearer. This HMI could be of any kind (little LCD display, little speakers . . . ).

But here, the frame 120 comprises a communication unit 160 suitable to establish a radio contact with an informatics device (computer, smartphone, watch . . . ). The processing unit 150 can therefore send the parameter P1 and/or the calculated level of efficiency to this device, so that this information can be treated by this device.

This communication unit 160 is preferably a passive or active RFID chip. Such a chip does not require any battery to operate and can be scanned by a reader at a distance of 15 meters away from the scanner.

In the second embodiment shown in FIG. 2, the pair of eyeglasses 110 comprises a communication unit 145 able to send the data determined by the wearing sensor 140 (and by another sensors if any) to the processing unit 150.

Here again, this communication unit 145 is preferably a passive or active RFID chip able to be scanned by a reader 155 of the processing unit 150. In a variant, Bluetooth or WIFI could be used.

In this embodiment, the frame also comprises a clock embedded in the frame 120 and that is able to date the measure.

The time information to be associated with said measure can be either:
- the current time,
- an information relative to the type of day (school day or weekend day)
- a period (morning, afternoon, evening).

The frame can also comprise a memory to memorize the last measure(s) and the associated time information.

As explained hereunder, in both embodiments, the processing unit 150 is programmed to perform a method of monitoring the wearer of the pair of eyeglasses 110, this method including three main steps of:
- acquiring the data determined by the wearing sensor 140,
- deducing therefrom the parameter P1 relative to the length of time the wearer has worn the pair of eyeglasses 110 during a predetermined period, and
- comparing said parameter P1 with at least a predetermined datum to determine the level of efficiency of the optical deficiency treatment.

Preferably, this method comprises a fourth step of providing a feedback to the wearer, this feedback including information about if the pair of eyeglasses is worn enough and/or if the treatment is effective.

The first step is performed by the processing unit 150 that is connected to the wearing sensor 140. This step enables the processing unit 150 to store in its memory an acceleration value associated with the date of the measure of this acceleration.

The acceleration value can be an average of the acceleration experienced by the frame at the moment of the measure. But in this embodiment, the acceleration value is a Boolean that is equal to 0 if the acceleration is lower than a predetermined threshold (which signifies that the pair of eyeglasses is not worn at this moment), and equal to 1 else.

The processing unit 150 may also store, in association with the acceleration value, an environment data (here the measured brightness value).

This step is preferably performed regularly, at a predetermined frequency. This frequency is preferably lower than every 10 minutes, to save electrical power.

Here, a measure is done every 15 minutes.

To achieve this same aim, measurements may be limited to a predetermined period (for instance from 6 am to 11 pm). A child is indeed considered as sleeping between 11 pm and 6 am. During the night, the processing unit 150 is consequently on standby.

So as to save power, measurements may be stopped when the duration of wearing of the pair of eyeglasses has reached a predetermined target threshold in the day.

This target threshold is for instance equal to twelve hours. It is chosen to ensure the treatment to have the maximum efficiency. Its value may vary, for instance to be not too high at the beginning of the treatment (for instance equal to eight hours) and to increase regularly so as to reach rapidly an effective value. The second step consists in calculating a parameter P1 that illustrates to what extent the pair of eyeglasses 110 has been worn during a "predetermined period".

The predetermined period is preferably greater than four hours. It could be a part of a day (for instance from 6 am to 11 pm), a couple of days, a week, a month . . . . In a preferred embodiment, this predetermined period is equal to a day. Consequently, a new value of the parameter P1 is calculated each day by the processing unit 150.

Here, the parameter P1 is equal to an approximation of the duration for which the pair of glasses was worn.

The value of this parameter P1 is deduced from all the measures done during the previous day. To this end, the processing unit contemplates that, if the pair of eyeglasses was worn at the moment of a measure, it signifies that the pair of eyeglasses 110 was worn during 15 minutes before or after this moment. Consequently, to determine the parameter P1, the processing unit determines the number of times the pair of eyeglasses was worn at the moments of the measures of the previous day, and it multiplies this number by fifteen to obtain, in minutes, the wearing time.

Consequently, in this embodiment, the parameter P1 is equal to the "wearing time" (i.e. to an approximation of the length of time the wearer has worn the pair of eyeglasses 110 during the previous day).

In a variant, the parameter P1 may have other significations. It may be a Boolean equal to 0 if the wearing time is lower than a predetermined daily threshold (for instance 12 h 00), and equal to 1 else.

In another variant, the parameter P1 may be a matrix of two values. The first value could be the wearing time and the second value could be the length of time during which the two following conditions have been fulfilled:
(i) the pair of eyeglasses was worn,
(ii) the brightness level was greater than a predetermined threshold.

A great number of other variants may be considered.

The third step consists in comparing the parameter P1 (here the wearing time) with at least one threshold in order to determine the "level of efficiency" of the optical deficiency treatment.

The level of efficiency (or efficacy) relates to the amount of decrease of progression with the said treatment lens compared to the progression of Myopia the wearer would have encountered with a control lens having no means for changing the natural evolution of Myopia (for instance a single vision lens). The effect is usually expressed either in diopters (difference between the treatment and a control group wearing control lenses). It can also be expressed in percentage, in which case it's normalized by the progression of the control group (in order to express the difference of progression between treatment and the control group). Those values are time dependent (for example over one year, 2 years . . . ).

In practice, the parameter P1 is compared with thresholds read in a database. The values stored in the database are predetermined and result from a model that links durations of wearing of a pair of eyeglasses with efficiencies values of the optical deficiency treatment.

Thanks to this database, the processing unit can read an efficiency value corresponding to the determined wearing time (the parameter P1).

The used database (and model) depends on the type of refraction lenses 130 worn. Indeed, the model used to associate efficacy of the myopia slow down and wearing time can be dependent on the type of myopia control solution. Consequently, before this comparison step, the processing unit 150 reads in its memory the type of the used lenses 130 and it selects then a database as a function of the data read.

The level of efficiency is here expressed in percentage, 0% corresponding to a progression of Myopia identical to the one the wearer would have with control lenses, and 100% corresponding to the stop of the progression of Myopia. Here, this percentage can be higher than 100% in the event of a decrease in Myopia.

In a variant, 0% may correspond to the case where the pair of eyeglasses were not worn during the day and 100% may correspond to the target threshold (that is the wearing time for which maximum treatment efficacy is reached).

In this variant, the percentage may vary between these two values by following a mathematical law (e.g.: exponential). Indeed, it is known that the efficacy of the lenses 130 follows an exponential progression as a function of wearing time.

An example of graph illustrating this mathematical law for the above lens comprising a plurality of at least three optical elements is shown in FIG. 3. In this Figure, the vertical axis represents the efficiency Ef of the treatment, and the horizontal axis represents the time dt (hours) of wearing the pair of eyeglasses per day (considering that this pair is worn for the same duration each day of each week of a 1 year period).

In another variant, it could be possible to use a mathematical equation rather than a database to determine the level of efficiency.

In another variant, the level of efficiency could be determined as a function of the said environment parameter, so as to take into account that the efficiency of the wear of the pair of eyeglasses is greater in some conditions than in another. Indeed, time outdoors (with more light) has a protective effect against myopia onset and near work is more myopigenic.

In this variant, the calculation of the level of efficiency and/or the value of the target threshold can be adjusted based on the time spent in each visual environment. For example, it is possible to give more weight to time spent outdoors than to time spent indoors. In this variant, the target threshold (of 12H00) may be calculated through multiplication of outdoor time by a refraction factor greater than 1 (for instance equal to 2).

In another variant, the level of efficiency and/or the value of the target threshold could be determined as a function of the wearer's activity (determined by means of the accelerometer). In this variant, it is also possible to give more weight to time spent standing up than to time spent sitting down.

In another variant, the level of efficiency and/or the value of the target threshold could be determined as a function of the wearing posture, so as to take into account that the efficiency of the wear of the pair of eyeglasses is greater in some postures than in another (for instance in far vision postures).

In another variant, the level of efficiency and/or the value of the target threshold could be determined as a function of the time of wearing, so as to take into account that the efficiency of the wearing of the pair of eyeglasses is greater in the morning than in the evening. In this variant, it is possible to give more weight to time spent during the morning: the target threshold (of 12H00) may be calculated through multiplication of this time by a refraction factor greater than 1 (for instance equal to 2).

Then, during the fourth step, the processing unit 150 is programmed to provide a feedback to the wearer or to any person close to the wearer (parents, optometrist . . . ), by means of an HMI (for instance the screen of a computer or of a smartphone).

Here, the processing unit 150 is programmed to display, when the user requests this datum by using an application stored in his smartphone, the level of efficiency together with a message explaining the meaning of this level.

The processing unit 150 can also be programmed to display other data. For instance, the screen can display the daily wearing time of the previous day or days.

In a preferred embodiment, the processing unit 150 is also programmed to display an advice relating to the length of time the pair of eyeglasses has to be worn during the current day to ensure a good performance of the treatment.

For example, the advice can be emitted when the parameter P1 or the level of efficiency is lower than a predetermined first threshold.

If any, the processing unit 150 can display an alert relating to the need for the wearer to change his habits.

For instance, an alert can be emitted when the parameter P1 or the level of efficiency is lower than a predetermined second threshold (this second threshold being distinct and lower than the first one).

For example, if the wearing time is between 70% to 85% of the target threshold (12H00 per day), a reminder can be sent to parents if this behavior is repeated over a couple of days (for instance over 7 days).

If the wearing time drops below 70% over seven day or 50% one day, an alert is sent to the parents at the end of the day so that they can take action immediately.

On the contrary, a congratulation message can be emitted when the parameter P1 or the level of efficiency exceed a predetermined third threshold. Such a message can for instance be emitted when the wearer has worn the pair of eyeglasses more than 12 hours per day for 5 days.

In a variant, an encouragement feedback may be given when the parameter P1 or the level of efficiency exceeds a predetermined fourth threshold that is less than the third one (corresponding for instance to more than 95% of the target threshold for 5 days).

If the target threshold has been achieved, further recommendation to improve myopia control can be given to the wearer: spend more time outdoors, continue wearing spectacles, take more frequent visual breaks when he works on a computer . . . .

In another variant of the invention, a message can be emitted before the end of the day (for instance at 16 o'clock) if the wearer has not worn his pair of eyeglasses enough. This message may give an indication that 1 hour more is needed to achieve 70% of myopia control, 2 hours more to achieve 85% of myopia control . . . .

All the messages can be provided in any manner, via mobile device message, SMS, Instant message, email.

Thanks to these feedbacks and to the measured progression of myopia, an optometrist can make a decision on whether it is better to keep the type of lens 130 or to change these lenses by another type of lenses.

If myopia progression after each follow-up is going faster than the previous follow-up, the processing unit or the optometrist can ask for the wearer to wear the pair of eyeglasses for longer hours (the daily threshold value per day can be increased) and/or can recommend the change of the lenses (by lenses having optical elements with higher asphericity for instance).

The invention claimed is:

1. A monitoring equipment comprising:
   an eyewear that includes:
     a frame,
     at least one lens that is fixed to the frame and that is configured to change a natural evolution of an optical deficiency, the at least one lens including a first optical refraction area to provide correct vision to a wearer at a determined distance, and a second optical refraction area to change the natural evolution of the optical deficiency, and a wearing sensor configured to determine if the eyewear is being worn by a wearer; and processing circuitry programmed to:

acquire data determined by the wearing sensor, deduce therefrom a parameter relative to a length of time the wearer has worn the eyewear during a predetermined period, and compare said parameter with at least a predetermined datum to determine a level of efficiency of an optical deficiency treatment, wherein said at least a predetermined datum belongs to a model that links durations of wearing the eyewear with efficiency values of the optical deficiency treatment, and wherein the eyewear includes a computer memory that stores a type of the second optical refraction, and the model is selected as a function of the type.

2. The monitoring equipment according to claim 1, wherein, after comparing said parameter with said at least a predetermined datum, the processing circuitry is programmed to deduce therefrom an advice relating to the duration the eyewear has to be worn, and to provide the advice to the wearer by a human-machine interface.

3. The monitoring equipment according to claim 1, wherein the second optical refraction is of the type selected among:

optical elements designed to deviate rays of light to lower an eye elongation signal in front of the wearer's retina when the wearer wears said eyewear, or an addition of optical power and a prismatic optical power, or additional positive power in a periphery of the at least one lens, or scattering elements in the at least one lens.

4. The monitoring equipment according to claim 1, wherein, the optical deficiency being myopia, said at least one lens is designed to slow down the natural evolution of the optical deficiency.

5. The monitoring equipment according to claim 1, wherein said at least one wearing sensor is embedded in the frame.

6. The monitoring equipment according to claim 1, wherein said at least one wearing sensor is designed to be removably attached to the frame.

7. The monitoring equipment according to claim 1, wherein said processing circuitry is remote from the eyewear, and wherein said eyewear comprises communication circuitry configured to send said data determined by the wearing sensor to the processing circuitry.

8. The monitoring equipment according to claim 7, wherein the eyewear comprises an additional sensor configured to determine a time information to be associated with said data, and wherein said parameter is determined as a function of said time information.

9. The monitoring equipment according to claim 1, wherein said processing circuitry is programmed to deduce from the duration of the wear of the eyewear by the wearer an advice relating to the duration the eyewear has to be worn, and to provide the advice to the wearer by a human-machine interface.

10. The monitoring equipment according to claim 1, wherein said processing circuitry is programmed to deduce from the duration of wearing the eyewear by the wearer an alert relating to a need for the wearer to change the wearer's habits, and to provide the alert to the wearer by a human-machine interface.

11. The monitoring equipment according to claim 1, wherein the eyewear comprises another sensor configured to determine an environment parameter, and wherein said level of efficiency is determined based on said environment parameter.

12. A method of monitoring a wearer of eyewear that includes a frame, at least one lens that is fixed to the frame and that is configured to change a natural evolution of an optical deficiency and that includes a first optical refraction area to provide correct vision to the wearer at a determined distance and a second optical refraction area to change the natural evolution of the optical deficiency, and a wearing sensor configured to determine if the eyewear is being worn by a wearer, said method comprising:

acquiring data determined by the wearing sensor;

deducing therefrom a parameter relative to a length of time the wearer has worn the eyewear during a predetermined period; and comparing said parameter with at least a predetermined datum to determine a level of efficiency of an optical deficiency treatment, wherein said at least a predetermined datum belongs to a model that links durations of wearing the eyewear with efficiency values of the optical deficiency treatment and that is selected as a function of a type of the second optical refraction.

* * * * *